United States Patent
Jungbecker et al.

(10) Patent No.: US 6,752,249 B1
(45) Date of Patent: Jun. 22, 2004

(54) ACTUATING UNIT FOR AN ELECTROMECHANICALLY ACTUATED DISC BRAKE

(75) Inventors: Johann Jungbecker, Badenheim (DE); Stefan Schmitt, Eltville (DE); Oliver Hoffmann, Frankfurt (DE); Joachim Nell, Hanau (DE); Ernst Neuwirth, Herzogenaurach (DE); Wendelin Backes, Wörth (DE)

(73) Assignees: Continental Teves AG & Co., oHG, Frankfurt (DE); Ina Walzlager Schaeffler oHG, Herzogenaurach (DE)

( * ) Notice: Subject to any disclaimer, the term of this patent is extended or adjusted under 35 U.S.C. 154(b) by 40 days.

(21) Appl. No.: 10/088,823

(22) PCT Filed: Sep. 15, 2000

(86) PCT No.: PCT/EP00/09044

§ 371 (c)(1),
(2), (4) Date: Jun. 28, 2002

(87) PCT Pub. No.: WO01/21974

PCT Pub. Date: Mar. 29, 2001

(30) Foreign Application Priority Data

Sep. 23, 1999 (DE) .......................................... 199 45 543

(51) Int. Cl.⁷ ............................................... F16D 55/08
(52) U.S. Cl. ...................... 188/162; 188/265; 188/72.8; 188/31; 188/82.84
(58) Field of Search .............................. 188/72.1, 72.7, 188/72.8, 82.8, 82.84, 156, 157, 158, 161, 162, 163, 265, 31, 66

(56) References Cited

U.S. PATENT DOCUMENTS

| | | | |
|---|---|---|---|
| 4,567,967 A | * | 2/1986 | Crossman .................. 188/72.3 |
| 4,836,338 A | | 6/1989 | Taig |
| 4,927,212 A | * | 5/1990 | Harrison et al. .......... 303/115.2 |
| 5,829,557 A | | 11/1998 | Halasy-Wimmer et al. |
| 6,257,377 B1 | * | 7/2001 | Schumann .................. 188/72.8 |
| 6,315,092 B1 | * | 11/2001 | Schwarz ....................... 188/265 |
| 6,349,801 B1 | * | 2/2002 | Koth et al. ................. 188/72.8 |

FOREIGN PATENT DOCUMENTS

| | | |
|---|---|---|
| DE | 44 21 161 | 12/1995 |
| DE | 196 01 983 | 7/1997 |
| DE | 198 53 383 | 7/1999 |
| EP | 0 402 421 | 12/1990 |
| WO | WO 99/27270 | * 6/1999 |
| WO | 99/45292 | 9/1999 |

OTHER PUBLICATIONS

Patent Abstracts of Japan 3–37433 A., M–1109, May 2, 1991, vol. 15, No. 174, Sony Corp 'Brake Device'.
Patent Abstracts of Japan 11101283 A Apr. 13, 1999, Tokico Ltd., Appl.No. 09282859 'Motor–Driven Brake Device'.
Search Report of the German Patent Office for Appln 19945543.0.

* cited by examiner

Primary Examiner—Douglas C. Butler
Assistant Examiner—Bradley King
(74) Attorney, Agent, or Firm—Rader, Fishman & Grauer PLLC

(57) ABSTRACT

An actuating unit for an electromechanically actuated disc brake for automotive vehicles which is composed of a drive unit or an electric motor, an actuating element forming one of two friction linings into engagement with a brake disc, and a reducing gear. A freewheel mechanism that interacts with the electric motor has the function of a parking brake. In order to ensure a high level of reliability in operation of the parking brake and to render it resistant to external influences, in particular, oscillations or vibrations, the present invention suggest that the freewheel mechanism be configured in such a way that its clamping effect is produced by a form-locking torque transmission and that, in its actuated state, it prevents a rotational movement of a bearing in which the rotor of the electric motor is mounted.

32 Claims, 3 Drawing Sheets

ACTUATING UNIT FOR AN ELECTROMECHANICALLY ACTUATED DISC BRAKE

TECHNICAL FIELD

The present invention generally relates to brake actuating elements and more particularly relates to an actuating unit for an electromechanically actuated disc brake for automotive vehicles.

BACKGROUND OF THE INVENTION

EP 0 402 421 B1 discloses an electromechanic actuating unit of this type. The electric motor drives the reducing gear by way of the freewheel mechanism in the prior-art actuating unit. The freewheel mechanism which permits a frictional torque transmission prevents a rotational movement of the electric motor in the direction opposite to its actuating direction or in the release direction of the brake when reaction forces occur and, thus, acts as a parking brake.

What is disadvantageous in the prior-art actuating unit is, especially, the functional principle of the freewheel mechanism employed, the clamping effect of which will slowly yield in a high-frequent excitation or under vibration stress due to a micro-sliding action in the loading direction so that the retaining force required cannot be ensured. This means that a freewheel mechanism of this type is inappropriate for use under safety aspects, such as e.g. in the operation of a parking brake, where it is absolutely imperative to maintain the holding effect.

BRIEF SUMMARY OF THE INVENTION

In view of the above, an object of the present invention is to disclose an electromechanic actuating unit of the type initially referred to wherein an inadvertent release of the parking brake is prevented, thereby increasing its reliability in operation. Another objective is to achieve a space-saving, compact construction of the electromechanic actuating unit.

According to the present invention, this object is achieved in that the freewheel mechanism is configured so that its clamping effect is ensured by a form-locking torque transmission, and that, in its actuated state, it prevents a rotational movement of a bearing in which the rotor of the electric motor is mounted. Preferably, the bearing may be configured as a ball bearing, a needle bearing, or a roller bearing.

In a preferred embodiment, the present invention includes a freewheel mechanism forming a subassembly with the bearing, wherein both the outside and the inside ring of the bearing are extended on one side in such a fashion that they enter into a form-locking engagement with the clamping element of the freewheel mechanism. These measures permit the integration of components in a much more compact manner.

In a preferred aspect of the subject matter of the present invention, the inside ring of the bearing has a profile which permits a form-locking accommodation of the clamping element, and the outside ring has at least one radial recess and a subsequent slope or ramp which, along with the profiling, limits at least one clamping slot in which the clamping element is received.

In another embodiment of the present invention, the clamping element is biassed in the direction of the recess by means of a spring element. Favorably, the spring element is configured as a circlip or a leaf spring.

An actuation of the parking brake of the present invention which is easy to realize and ensures a reliable operation is achieved according to another feature of this invention because the freewheel mechanism is operable by means of an electromagnetic actuating unit.

The electromagnetic actuating unit is preferably comprised of an electromagnet and a tappet which is movable into a force-transmitting engagement with the clamping element, and the electromagnet is designed as a bistable electromagnet.

The clamping element may be configured as a jamming roller or a ball.

In a particularly favorable embodiment of the subject matter of the present invention, the reducing gear is configured as a ball-and-thread drive assembly, the actuating element being the threaded nut of the ball-and-thread drive assembly.

To considerably reduce the necessary drive torque to be produced by the electric motor, the force transmission between the electric motor and the reducing gear is effected by means of a second reducing gear.

In a preferred aspect of the subject matter of the present invention, the electric motor, the (first) reducing gear, and the second reducing gear are designed as at least two independent assemblies so that the electric motor is arranged outside the flux of force of the clamping force and its function cannot be impaired by disturbing influences. This arrangement has an additional benefit because it uncouples the second reducing gear from the (first) reducing gear so that, especially when the second reducing gear is configured as a planetary gear, an equal position of the rotor of the electric motor in relation to the planet wheels and of the planet wheels in relation to the ring gear can be ensured. Designing the second reducing gear as a planetary gear permits considerably reducing the necessary drive torque that is to be generated by the electric motor, with the planetary gear representing an anti-friction gear which does not require any work of deformation and allows achieving a high efficiency with a small mounting space.

It is especially favorable that the electric motor, the first reducing gear, and the second reducing gear is designed as one independent subassembly each. An electromechanic actuating unit of a like design is characterized by high efficiency, extraordinary dynamics of brake actuation, and an extremely compact construction permitting high mass-related brake torques to be transmitted. Besides, subassemblies of a modular design can be constructed and tested separately.

In a favorable aspect of the subject matter of the present invention, the second reducing gear is arranged on the side of the electric motor remote from the brake linings. This measure permits a constructive uncoupling of the second reducing gear from the first reducing gear so that deformation of the second reducing gear is effectively prevented and clearances can be maintained constant within the gear unit.

A higher gear ratio is achieved in another embodiment of the subject matter of the present invention in that the second reducing gear is configured as a planetary gear, preferably with stepped planet wheels. It is, however, also possible to design the second reducing gear as a two-step differential planetary gear. In the last-mentioned gear type, an optimal overall length is achieved because a large sun wheel can be used.

According to another feature of the present invention, uncoupling of the flux of force from the drive unit or the electric motor is ensured because there is provision of a guide member which is supported on a casing that accommodates the ball-and-thread drive assembly and embraces the threaded nut, the threaded spindle being axially supported on the guide member. The axial support of the threaded spindle is carried out by the intermediary of an axial bearing by means of a radial collar. This allows using a bearing with a very small diameter.

It is particularly advantageous that force-measuring elements are provided on the guide member, thereby allowing to effect force measurements at the part that is not moved and is subject to a defined deformation.

An effective protection of the arrangement against contaminants and the ingress of water is achieved due to an elastic seal or sleeve that is interposed between the threaded nut and the guide member.

In another favorable embodiment of the subject matter of the present invention, the sun wheel of the planetary gear is designed on the rotor, while the planet wheels are mounted in a planet cage (which is in a force-transmitting connection with the threaded spindle) and are comprised of a first planet wheel of large diameter that is in engagement with the sun wheel and a second planet wheel of small diameter that is in engagement with a ring gear.

The mounting space is optimized in the above-mentioned design because the ring gear of the planetary gear is formed by an internal toothing in a cover which represents a case of the planetary gear and is mounted on the casing of the electric motor.

In another embodiment of the subject matter of the present invention, the assembly of the actuating unit of the present invention is considerably simplified because the transmission of force between the planet cage and the threaded spindle occurs by means of a form-locking plug coupling.

A low-cost design of the actuating unit of this invention involves that the planet cage is mounted in the cover by means of a radial bearing. A planetary gear of this type is easy to manufacture and allows separate testing.

It is suitable that the form-locking plug coupling is coupled to the planet cage in a torsion-proof, radially yielding and flexible fashion. This measure allows an effective isolation of disturbing influences.

The threaded spindle may preferably have a multi-part design.

In another favorable design of the subject matter of the present invention, the threaded nut at its end remote from the first friction lining includes an axial projection which is movable into abutment with a stop that is provided on the threaded spindle also in an axial direction and acts in a circumferential direction. Jamming or clamping of the first reducing gear is prevented by this provision, in particular in a faulty release action, where the threaded nut is reversed until its stop.

In further favorable embodiments of the present invention, the electric motor may be configured as an electronically commutated electric motor (non-brush d-c motor) energized by a permanent magnet, or a switched reluctance motor (SR=Switch Reluctance motor).

The types of motors mentioned above are especially suited to produce high torques during standstill.

In order to electronically commutate the motor of the actuating unit, it is necessary to provide a position detection system which permits detecting the position of the rotor of the electric motor in relation to the stator and, preferably, includes a Hall sensor or a magnetoresistive element.

DETAILED DESCRIPTION OF THE PREFERRED EMBODIMENTS

Figure 1:
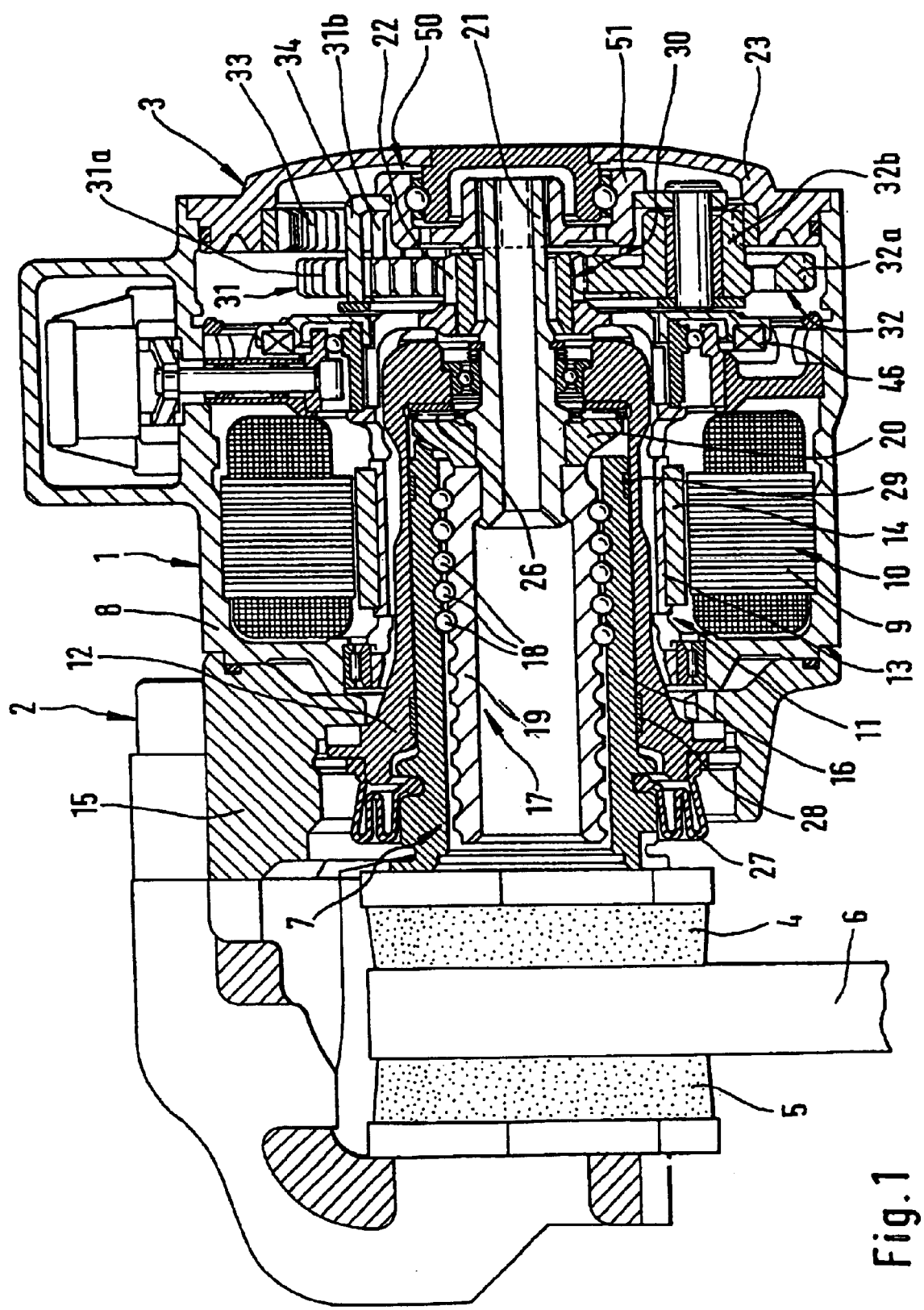
FIG. 1 is an axial cross-sectional view of a design of the electromechanic actuating unit of the present invention.

The electromechanic actuating unit of the present invention, as shown in the drawings, is used to actuate a floating-caliper disc brake whose brake caliper (only represented) is slidably supported in a stationary holder (not shown). A pair of friction linings 4 and S is arranged in the brake caliper so that they face the left-hand and right-hand lateral surface of a brake disc 6.

In the following, friction lining 4 that is shown on the right in the drawing is referred to as first friction lining, and the other friction lining designated by reference numeral 5 is referred to as second friction lining. While the first friction lining 4 is movable into engagement with the brake disc 6 by the actuating unit directly by means of an actuating element 7, the second friction lining 5 is urged against the opposite lateral surface of brake disc 6 by the effect of a reaction force generated by the brake caliper, when the assembly is actuated.

The actuating unit of the present invention which is fitted to the brake caliper by way of securing means (not shown), has a modular design and is generally comprised of three independent subassemblies or modules, namely a drive unit 1, a first reducing gear 2 that actuates the first friction lining 4, and a second reducing gear 3 that is interconnected in terms of effect between drive unit 1 and the first reducing gear 2.

The actuating unit 1 mentioned above is comprised of an electric motor 10 which, in the example shown, is a permanent-magnet-energized, electronically commutated motor whose stator 9 is immovably arranged in a motor casing 8 and whose rotor 11 is provided by an annular carrier 13 that carries a plurality of permanent magnet segments 14. The first reducing gear 2 is interposed between the electric motor 10 and the above-mentioned actuating element 7 in terms of effect and, in the example shown, is configured as a ball-and-thread drive assembly 16 to 21 accommodated in a gearbox case 15, which may also be of integral design with the above-mentioned brake caliper. In this arrangement, the ball-and-thread drive assembly comprises a threaded nut 16 and a threaded spindle 17, with several balls 18 being arranged between the threaded nut 16 and the threaded spindle 17 which circulate upon a rotational movement of the threaded spindle 18 and put the threaded nut 16 into an axial or translatory movement. The threaded nut 16 preferably forms the above-mentioned actuating element 7. The threaded spindle 17 driven by the electric motor 10 by way of the second reducing gear 3 preferably has a three-part design and is comprised of a tubular first spindle member 19 which is in engagement with the threaded nut 16 by means of the above-mentioned balls 18, an annular second spindle member 20, and a third spindle member 21.

The arrangement is preferably chosen so that the rotor 10 of the motor 11 drives the third spindle member 21 by the intermediary of the second reducing gear 3, and the threaded nut 16 is supported on the first friction lining 4.

In the embodiment of the present invention illustrated in the drawings, the necessary engine torque is reduced by an expedient integration of a planetary gear 30–34 which forms the above-mentioned second reducing gear 3. The planetary gear, which is interposed between rotor 11 and threaded spindle 17 in terms of effect, is comprised of a sun wheel 30 which preferably includes an externally toothed area 22 on rotor 11, a plurality of stepped planet wheels, two of which are shown and have been assigned reference numerals 31 and 32, and a ring gear 33. The stepped planet wheels 31, 32 accommodated in a planet cage 34 have a first step interacting with the sun wheel 30 and a second step interacting with the ring gear 33, the first step being formed of toothed wheels 31a, 32a of large diameter and the second step being formed of toothed wheels 31b, 32b of small diameter. Preferably, the above-mentioned planet cage 34 is configured so that its area positioned between the points of support of the planet wheels 31, 32 and the point where the threaded spindle 17 is coupled allows a small axial clearance and a radial clearance and a small offset angle and, for example, is configured as a lamellar plate or a pleated bellows. Ring gear 33 is formed of an internally toothed area of a cover 23 that represents the case of the planetary gear.

The above-mentioned threaded nut 16 of the ball-and-thread drive assembly is guided and mounted in a bowl-shaped guide member 12. The mounting support of the threaded nut 16 in the guide member 12 is carried out in its area close to the first friction lining 4 by means of a first slide ring 28 arranged in guide member 12 as well as in its end area remote from the friction lining 4 by means of a second slide ring 29 arranged on the threaded nut 16.

Further, it can be taken from FIG. 1 that the second annular spindle member 20 is supported on an axial bearing 26 which is arranged within the guide member 12, while the third spindle member 21 is connected to the planet cage 34 of the second reducing gear 3 by means of a form-locking plug coupling. For this purpose, the end of the third spindle member 21 is e.g. configured as a Torx connection or a hexagon that is slipped into a matingly shaped opening in the planet cage 34. It is especially favorable that the form-locking plug coupling is coupled to the planet cage 34 in a torsion-proof, radially yielding and flexible manner. Coupling is effected by means of an outside ring 51 of a radial bearing 50 provided in the cover 23. An elastic seal or sealing sleeve 27 interposed between the threaded nut 16 and the guide member 12 prevents the ingress of contaminants into the interior of the ball-and-thread drive assembly.

Moreover, it is expedient for a proper functioning of the actuating unit of the present invention when the threaded nut 16, at its end remote from the friction lining 4, has an axial projection (not shown) which, during its resetting action, interacts with a stop that is provided on the periphery of the second spindle member 20. Further resetting of the threaded nut 16 is effectively prevented by supporting a lateral surface of the projection on the stop so that the two members 16, 20 will not be jammed.

There is provision of a position detection system 46 (not shown) to determine the current position of the rotor 11. The position information is then determined by means of a Hall sensor or a magnetoresistive element.

In order to realize the function of a parking brake, the actuating unit of the present invention includes electromechanic means which interact with the rotor 11 of the electric motor 10 and permit it being locked. In the embodiment shown, the electromechanic means is an electromagnetically operable freewheel mechanism which has been assigned reference numeral 35 and interacts with a radial bearing 24 in which the rotor 11 is mounted. The electric actuator means associated with the freewheel mechanism 35 is designed in the way of a mechanic flipflop whose condition changes with each short energization.

Figure 2:
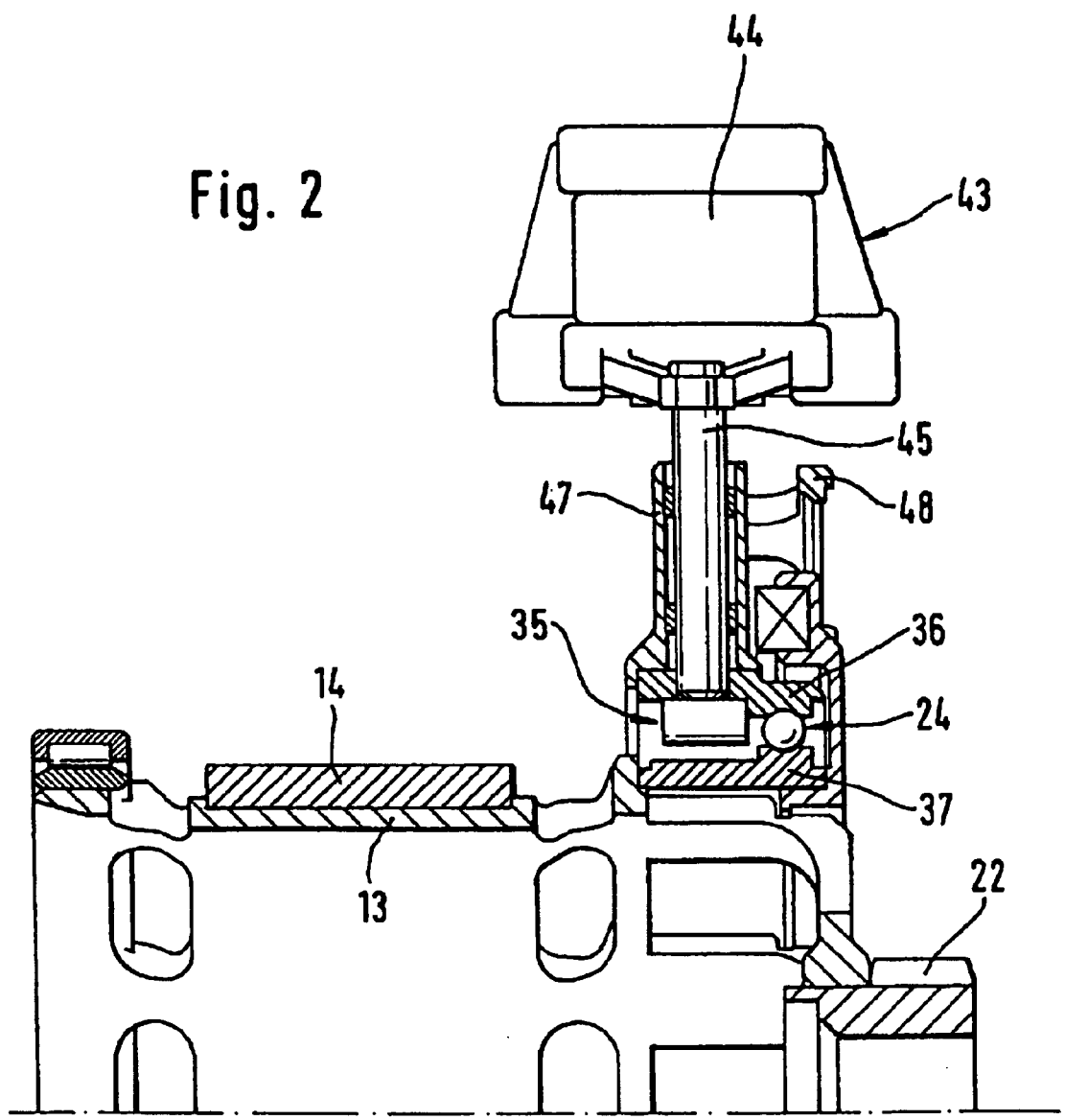
FIG. 2 is a design view of the parking brake device utilized in the actuating unit of FIG. 1.
Figure 4:
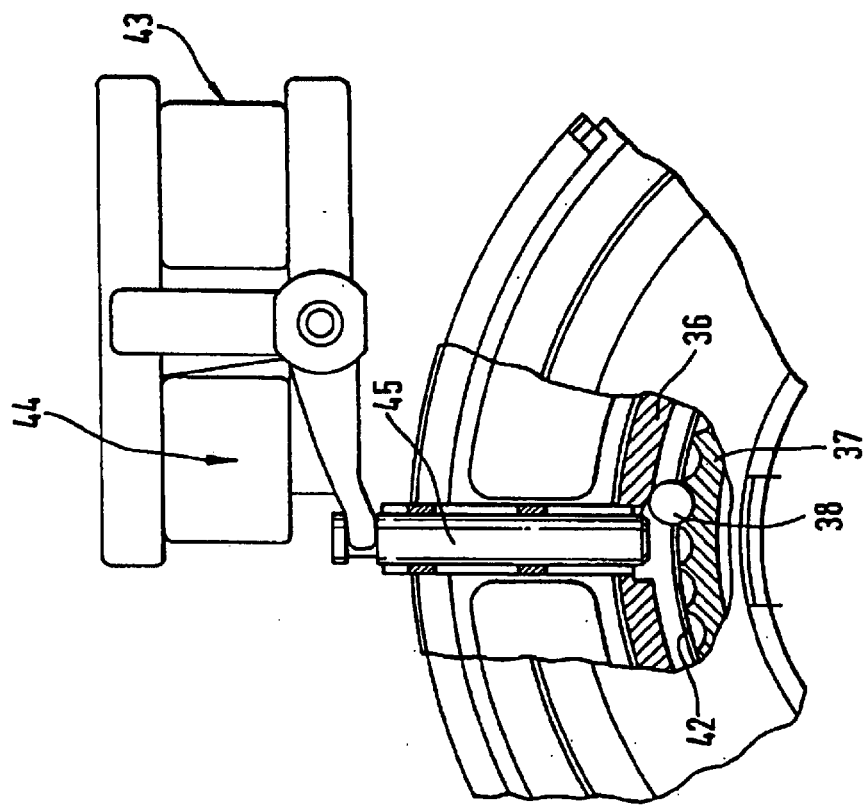
FIG. 4 is a broken view of the parking brake device of FIG. 2 in its actuated position.
Figure 3:
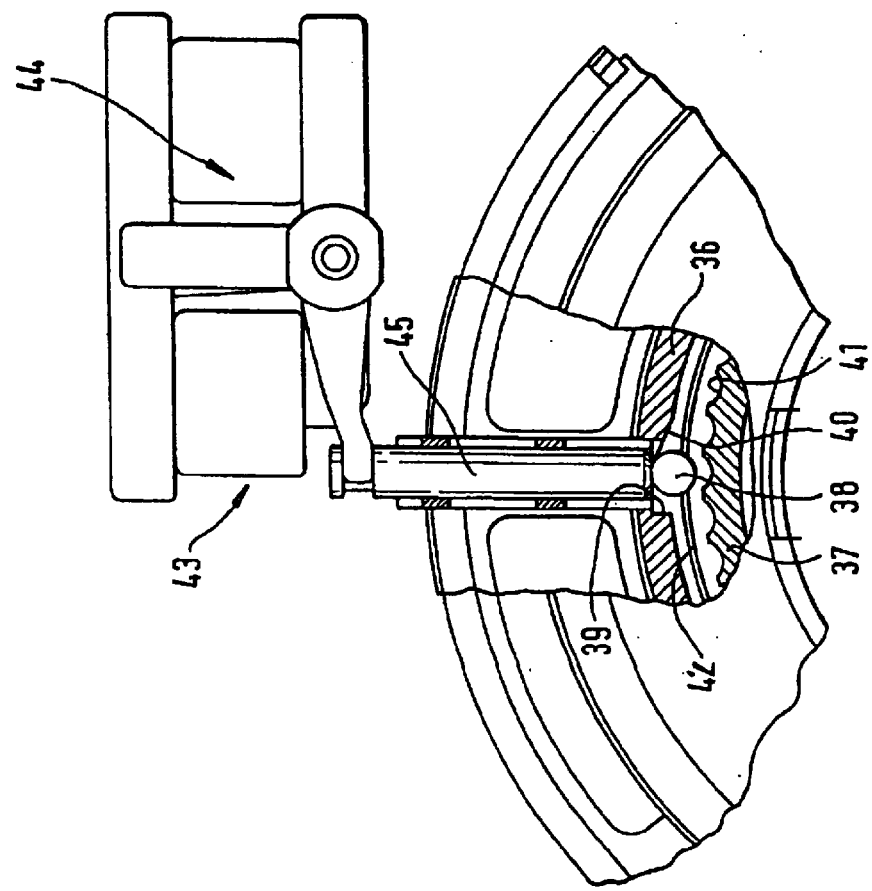
FIG. 3 is a broken view of the parking brake device of FIG. 2 in its rest position.

As can be taken from FIGS. 2 to 4 in particular, the basic parts of freewheel mechanism 35 are integrated in the above-mentioned radial bearing 24. To this end, both the outside ring 36 and the inside ring 37 of the radial bearing 24 are extended on one side so that they confine an annular chamber in which a clamping element 38 is received. A form-locking engagement between the bearing rings 36, 37 and the clamping element 38 is achieved due to the special configuration of the extended area of the bearing rings 36, 37. The outside ring 36, preferably in its area interacting with the clamping element 38, includes a radial recess 39 which is confined on one side by a slope or ramp 40, while the inside ring 37 includes a profiling 41 which corresponds to the contour of the clamping element 38 and, along with the recess, limits a clamping slot. Clamping element 38 which may be designed as a jamming roller or as a ball is biassed towards the above-mentioned recess 39 by means of an annular spring element 42.

The freewheel mechanism 35 is actuated by an electromagnetic actuating device which is designated by reference numeral 43 in the example shown. The actuating device 43 is basically composed of a bistable electromagnet 44 and a tappet 45 which interacts with the armature of the electromagnet 44 and adjusts the clamping element 38 radially when the electromagnet 44 is activated. Tappet 45 is guided in a tubular guide 47 which is shaped at an annular accommodating member 48 that receives the outside bearing ring 36 and is arranged in the motor casing 8.

The following sequence of operations is provided: Initially, the electromechanic brake is tensioned to reach the necessary level of tensioning force. Rotor 11 or inside bearing ring 37 is moved during tensioning in opposition to the clamping direction of the freewheel mechanism 35, i.e., to the right in the drawing. When the clamping element 38 is shifted in the direction of the profiling 41 during actuation of the parking brake due to activation of electromagnet 44, it will roll on the above-mentioned ramp 40 into the tapering clamping slot. When the current supplied to the electric motor 10 is reduced, the spring force of the tensioned brake will tend to turn the rotor 11 or the inside bearing ring 37 in the clamping direction. This will reliably lock the parking brake. The actuated position of the parking brake is illustrated in FIG. 4.

For release purposes, the electric motor 10 must tension the brake only slightly and the electromagnet 44 must be actuated only one time in order to move the tappet 45 in an upward direction. The clamping element 38 which is thereby relieved from load is urged by the force of the spring element 42 biassing it into the recess 39 of the outside bearing ring 36, and the rotor 11 is freely rotatable in both directions.

Of course, various modifications are feasible in the spirit of the present invention. For example, the electric motor that is used as drive unit 1 may be designed as a switched reluctance motor (SR-motor). Other designs of the planetary gear are also possible, such as a two-stepped differential planetary gear or a gear whose planet wheels with their first step are in engagement with a sun wheel and with their second step, by the intermediary of each one spur wheel, are in engagement with a ring gear. Gear units which achieve high reduction ratios due to a deformable toothed ring and eccentricity are of course also feasible.

The inside bearing ring, too, is possible with most different types of profiling. It is only important that the clamping element can adopt a safe position. The annular spring element which biasses the clamping element is not required to embrace the entire periphery. It is possible to arrange a leaf spring which is anchored in the vicinity of the clamping element only. A design of the spring element as a so-called 'beyond dead-center spring' (bangling tin frog) is also possible.

To prevent transverse forces or deformations which are due to the clamping effect, several clamping elements may be arranged evenly on the periphery.

List of Reference Numerals:

1 drive unit
2 reducing gear
3 reducing gear
4 friction lining
5 friction lining
6 brake disc
7 actuating element
8 motor casing
9 stator
10 electric motor
11 rotor
12 guide member
13 carrier
14 permanent magnet segment
15 gearbox case
16 threaded nut
17 threaded spindle
18 ball
19 spindle member
20 spindle member
21 spindle member
22 area
23 cover
24 radial bearing
25
26 axial bearing
27 seal
28 slide ring
29 slide ring
30 sun wheel
31 planet wheel
31a planet wheel
31b planet wheel
32a planet wheel
32b planet wheel
33 ring gear
34 planet cage
35 freewheel mechanism
36 outside ring
37 inside ring
38 clamping element
39 recess
40 slope
41 profiling
42 spring element
43 actuating unit
44 electromagnet
45 tappet
46 position detection system
47 guide
48 accommodating member
49
50 radial bearing
51 outside ring

What is claimed is:

1. Actuating unit for an electromechanically actuated disc brake for automotive vehicles that is mounted to a brake caliper in which two friction linings are arranged to slidably interact with each one lateral surface of a brake disc, wherein one of the friction linings is movable into engagement with the brake disc by the actuating unit directly by means of an actuating element and the other friction lining is movable into engagement with the brake disc by the effect of a reaction force generated by the brake caliper, wherein the actuating unit comprises:
    an electric motor having a rotor,
    a reducing gear engaged with the electric motor,
    a freewheel mechanism coupled to the electric motor, wherein the freewheel mechanism is configured to exert a binding effect on a bearing which supports the motor rotor thereby preventing rotation movement of the bearing,
    wherein both an outside ring and an inside ring of the bearing are extended on one side in such a fashion that they enter into a form-locking engagement with a clamping element of the freewheel mechanism,
    wherein the inside ring of the bearing has a profile which permits a form-locking accommodation of the clamping element, and the outside ring has at least one radial recess and a subsequent slope or ramp which, along with the profiling, defines at least one clamping slot in which the clamping element is received,
    wherein the freewheel mechanism is operable by means of an electromagnet.

2. Actuating unit as claimed in claim 1, wherein the freewheel mechanism along with the bearing forms a subassembly.

3. Actuating unit as claimed in claim 1, wherein the clamping element is biased in the direction of the radial recess by means of a spring element.

4. Actuating unit as claimed in claim 3, wherein the spring element is configured as a circlip.

5. Actuating unit as claimed in claim 3, wherein the spring element is configured as a leaf spring.

6. Actuating unit as claimed in claim 1, wherein the electromagnet includes of an electromagnet and a tappet which is movable into a force-transmitting engagement with the clamping element of the freewheel mechanism.

7. Actuating unit as claimed in claim 6, wherein the electromagnet is designed as a bistable electromagnet.

8. Actuating unit as claimed in claim 1, wherein the clamping element is designed as a jamming roller.

9. Actuating unit as claimed in claim 1, wherein the clamping element has the shape of a ball.

10. Actuating unit as claimed in claim 1, wherein the bearing is designed as a ball bearing, a needle bearing, or a roller bearing.

11. Actuating unit as claimed in claim 1, wherein a second reducing gear is provided between the electric motor and the reducing gear.

12. Actuating unit as claimed in claim 11, wherein the electric motor, the first reducing gear and the second reducing gear are designed as at least two independent subassemblies.

13. Actuating unit as claimed in claim 11, wherein the electric motor, the first reducing gear and the second reducing gear are designed as one subassembly.

14. Actuating unit as claimed in claim 1, wherein the first reducing gear is configured as a ball-and-thread drive assembly.

15. Actuating unit as claimed in claim 1, further including an actuating element disposed between the reducing gear and one of the disk brakes, wherein the actuating element is formed by a threaded nut of the ball-and-thread drive assembly.

16. Actuating unit as claimed in claim 11, wherein the second reducing gear is arranged on a side of the electric motor remote from the brake linings.

17. Actuating unit as claimed in claim 11, wherein the second reducing gear is configured as a planetary gear.

18. Actuating unit as claimed in claim 17, wherein the second reducing gear is configured as a planetary gear with stepped planet wheels.

19. Actuating unit as claimed in claim 15, wherein a guide member is provided which embraces the threaded nut of the ball-and-thread drive assembly, wherein the ball-and-thread drive assembly is supported on a gearbox case, and wherein a threaded spindle is axially supported by said threaded nut.

20. Actuating unit as claimed in claim 19, wherein the axial support of the threaded spindle is carried out by means of a radial collar.

21. Actuating unit as claimed in claim 19, wherein an elastic seal is interposed between the threaded nut and the guide member.

22. Actuating unit as claimed in claim 17, wherein a sun wheel of the planetary gear is designed on the rotor, and wherein said planetary gear includes planet wheels, wherein the planet wheels are mounted in a planet cage that is in a force-transmitting connection with a threaded spindle, and whereas each planet wheel in said planet wheels, is comprised of a first planet wheel of large diameter that is in engagement with the sun wheel and a second planet wheel of small diameter that is in engagement with a ring gear.

23. Actuating unit as claimed in claim 22, wherein the ring gear of the planetary gear is formed of an internal toothing in a cover which represents a case of the planetary gear and is mounted on a casing of the electric motor.

24. Actuating unit as claimed in claim 22, wherein the transmission of force between the planet cage and the threaded spindle is effected by means of a form-locking plug coupling.

25. Actuating unit as claimed in claim 22, wherein the planet cage is mounted in a cover by means of a radial bearing.

26. Actuating unit as claimed in claim 22, wherein a form-locking plug coupling is connected to the planet cage in a torsion-proof, radially yielding and flexible fashion.

27. Actuating unit as claimed in claim 19, wherein the threaded spindle is of a multi-part design.

28. Actuating unit as claimed in claim 1, wherein the electric motor is configured as an electronically commutated electric motor energized by a permanent magnet.

29. Actuating unit as claimed in claim 1, wherein the electric motor is configured as a switched reluctance motor.

30. Actuating unit as claimed in claim 1, wherein a position detection system is provided which permits detecting the position of the rotor.

31. Actuating unit as claimed in claim 30, wherein the position detection system includes a Hall sensor.

32. Actuating unit as claimed in claim 30, wherein the position detection system includes a magnetoresistive element.

* * * * *